(12) United States Patent
Jacob et al.

(10) Patent No.: US 10,746,925 B2
(45) Date of Patent: Aug. 18, 2020

(54) SILICON NITRIDE GRATING COUPLERS

(71) Applicant: GLOBALFOUNDRIES Inc., Grand Cayman (KY)

(72) Inventors: Ajey P. Jacob, Watervliet, NY (US); Yusheng Bian, Ballston Lake, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 216 days.

(21) Appl. No.: 15/878,025

(22) Filed: Jan. 23, 2018

(65) Prior Publication Data

US 2019/0227229 A1 Jul. 25, 2019

(51) Int. Cl.
*G02B 5/18* (2006.01)
*G02B 6/124* (2006.01)
(Continued)

(52) U.S. Cl.
CPC ............. *G02B 6/124* (2013.01); *G02B 6/132* (2013.01); *G02B 6/136* (2013.01); *G02B 6/30* (2013.01);
(Continued)

(58) Field of Classification Search
CPC ... G02B 6/12; G02B 6/30; G02B 6/34; G02B 6/122; G02B 6/124; G02B 6/131; G02B 6/136; G02B 6/132; G02B 6/305; G02B 6/12004; G02B 6/1228; G02B 6/2852; G02B 6/3512; G02B 6/3566; G02B 6/3596; G02B 6/3885; G02B 6/4214; G02B 6/422; G02B 6/12002; G02B 6/12016; G02B 6/1203; G02B 6/4208; G02B 6/4266; G02B 5/30; G02B 2006/121; G02B 2006/12038; G02B 2006/12097; G02B 2006/12104; G02B 2006/12121; G02B 2006/12107; G02B 2006/12169; G02B 6/12033; G01N 21/648; G01N 21/6408; G01N 21/6428; G01N 21/6454

See application file for complete search history.

(56) References Cited

U.S. PATENT DOCUMENTS 5,033,812 A 7/1991 Yoshida et al.
5,101,459 A 3/1992 Sunagawa
(Continued)

OTHER PUBLICATIONS

Richard Soref, "Mid-infrared photonics in silicon and germanium", Nature Photonics | vol. 4 | August 2010 | www.nature.com/naturephotonics.
(Continued)

*Primary Examiner* — Mustak Choudhury
(74) *Attorney, Agent, or Firm* — Thompson Hine LLP; Anthony Canale

(57) ABSTRACT

Grating couplers and methods of fabricating a grating coupler. The grating coupler may include a plurality of grating structures arranged on a substrate and a layer arranged over the grating structures. The grating structures are composed of a first material characterized by a first refractive index with a real part. The layer is composed of a second material characterized by a second refractive index with a real part. The real part of the second refractive index is greater than the real part of the first refractive index of the first material for electromagnetic radiation with a wavelength in a range of 1 micron to 9 microns.

13 Claims, 4 Drawing Sheets

(51) Int. Cl.
  *G02B 6/136* (2006.01)
  *G02B 6/132* (2006.01)
  *G02B 6/30* (2006.01)
  *G02B 6/12* (2006.01)

(52) U.S. Cl.
  CPC ............. *G02B 2006/12038* (2013.01); *G02B 2006/12107* (2013.01); *G02B 2006/12121* (2013.01)

(56) References Cited

U.S. PATENT DOCUMENTS

| | | |
|---|---|---|
| 7,184,625 B2 | 2/2007 | Gunn, III et al. |
| 8,791,405 B2 | 7/2014 | Ji et al. |
| 2002/0191916 A1 | 12/2002 | Frish et al. |
| 2005/0045799 A1* | 3/2005 | Deng ................... G02B 5/3083 250/200 |
| 2005/0135453 A1* | 6/2005 | Kneissl ................. B82Y 20/00 372/94 |

OTHER PUBLICATIONS

Roelkens, et al, "Long-wavelength silicon photonic integrated circuits", Aug. 27-29, 2014 IEEE 11th International Conference on Group IV Photonics (GFP).

\* cited by examiner

SILICON NITRIDE GRATING COUPLERS

BACKGROUND

The present invention relates to photonics chips and, more specifically, to grating couplers and methods of fabricating grating couplers.

Photonic integrated circuits are devices on which optical and electronic components are integrated. Grating couplers are commonly used to couple light from an optical fiber into an on-chip waveguide, which is considerably smaller than the optical fiber. The grating coupler may be formed by notching the waveguide. Light that diffracts from the grating coupler will constructively interfere at a given scattering angle that is directed toward the optical fiber. The scattering angle of the grating coupler may be determined by the period of the grooves in waveguide.

Improved grating couplers and methods of fabricating grating couplers are needed.

SUMMARY

In an embodiment of the invention, a structure includes a grating coupler with a plurality of grating structures on a substrate and a layer arranged over the grating structures. The grating structures are composed of a first material characterized by a first refractive index with a real part. The layer is composed of a second material characterized by a second refractive index with a real part. The real part of the second refractive index is greater than the real part of the first refractive index of the first material for electromagnetic radiation with a wavelength in a range of 1 micron to 9 microns.

In an embodiment of the invention, a structure includes a grating coupler with a plurality of grating structures arranged on a substrate. Each of the grating structures has a trapezoidal shape.

In an embodiment of the invention, a method includes forming a plurality of grating structures on a top surface of a substrate, and forming either a layer over the grating structures or spacers at a plurality of sidewalls of the grating structures. The grating structures are composed of a first material characterized by a first refractive index with a real part. The layer or the spacers are composed of a second material characterized by a second refractive index with a real part. The real part of the second refractive index is greater than the real part of the first refractive index of the first material for electromagnetic radiation with a wavelength in a range of 1 micron to 9 microns.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
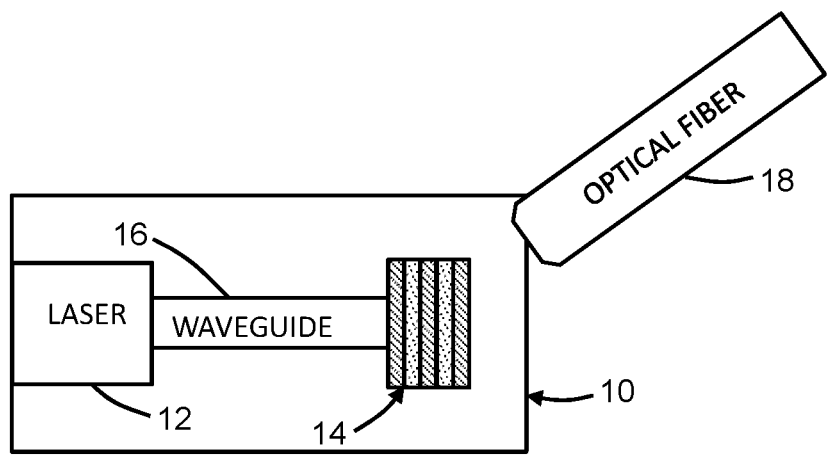
FIG. 1 is a top view of an optical fiber and a photonics chip in accordance with embodiments of the invention.
Figure 2:
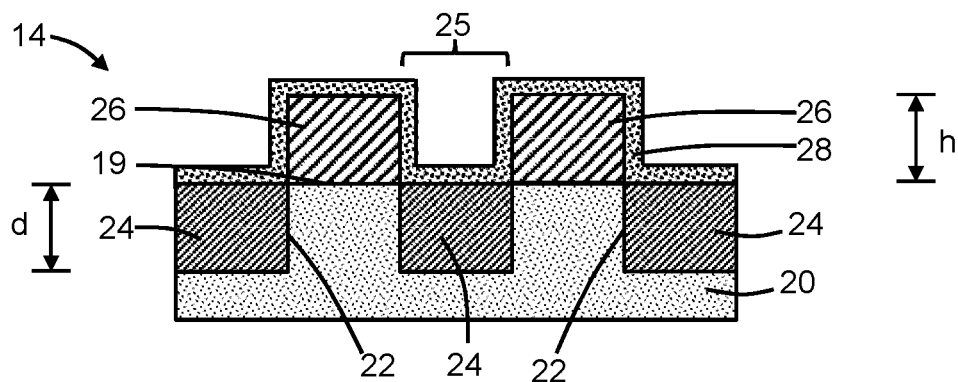
FIG. 2 is a cross-sectional view of a portion of the photonics chip taken generally along line 2-2 in FIG. 1.

With reference to FIGS. 1, 2 and in accordance with embodiments of the invention, a photonics chip 10 may include a laser 12 and a grating coupler 14 that is coupled by a waveguide 16 with the laser 12, as well as other electronic device structures and/or photonic device structures. An optical fiber 18 is arranged relative to the grating coupler 14 on the photonics chip 10 but in a different plane than the waveguide 16. The optical fiber 18 may supply light signals to the grating coupler 14 or receive light signals from the grating coupler 14. For example, the grating coupler 14 may couple light signals from the photonics chip 10 and waveguide 16 to the optical fiber 18. The laser 12, grating coupler 14, and waveguide 16 are located on a substrate 20, which may be composed of single crystal silicon, and the optical fiber 18 may have a core surrounded by a cladding of lower refractive index.

The grating coupler 14 includes a periodic arrangement of dielectric regions 24 that are arranged in a set of trenches or grooves 22 that are formed in the substrate 20. In an embodiment, the grooves 22 and dielectric regions 24 may be arranged as a group of parallel linear features having a given pitch and given dimensions (e.g., a given width). The grooves 22 may be formed using lithography and etching processes, and may be filled by a dielectric material to form the dielectric regions 24. In an embodiment, the grooves 22 may be formed by forming a sacrificial etch mask over the substrate 20 and etching the substrate 20 with a directional etching process, such as reactive ion etching (RIE). In an embodiment, the dielectric regions 24 may be composed of an oxide of silicon (e.g., silicon dioxide ($SiO_2$)) that is deposited by chemical vapor deposition (CVD) thereby overfilling the grooves 22 and that is subsequently polished by chemical mechanical polishing (CMP) to remove dielectric material above the top surface 19 of the substrate 20. The dielectric regions 24, which inherit the periodicity of the grooves 22, are arranged beneath the top surface 19 of the substrate 20 and may be coplanar with the top surface 19 of the substrate 20. The number of grooves 22 may be greater than shown in the exemplary embodiment.

The grating coupler 14 further includes a periodic arrangement of grating structures 26 that are arranged above or over the top surface 19 of the substrate 20. The grating structures 26 may be formed by depositing a layer of material and patterning the layer using lithography and etching processes. In an embodiment, the material constituting the grating structures 26 may be a nitride of silicon (e.g., silicon nitride ($Si_3N_4$)) that is deposited by chemical vapor deposition (CVD). The period or pitch of the grating structures 26 may match the period or pitch of the grooves 22 and regions 24, and the grating structures 26 have a height, h, relative to the top surface 19 of the substrate 20 that may be equal to the thickness of the deposited layer. The number of grating structures 26 may be greater than shown in the exemplary embodiment. Adjacent grating structures 26 are separated by gaps 25.

A conformal layer 28 is formed as a cladding over the grating structures 26. In an embodiment, the conformal layer 28 may be composed of a material characterized by a refractive index with a real part that is greater than the real part of the refractive index of the material composing the grating structures 26. Generally, the refractive index of a material is a complex number that includes a real part that relates to diffraction and an imaginary part that relates to attenuation. In an embodiment, the conformal layer 28 may be composed of a material characterized by a refractive index with a real part that is greater than the real part of the refractive index of silicon nitride ($Si_3N_4$) for electromagnetic radiation over a wavelength range of 1 micron to 9 microns. In embodiments, the conformal layer 28 may composed of titanium nitride (TiN), polycrystalline or amorphous silicon (Si), polycrystalline or amorphous silicon germanium (SiGe), or a layered combination of two or more of these materials deposited by atomic layer deposition (ALD) or another deposition technique.

Figure 2A:
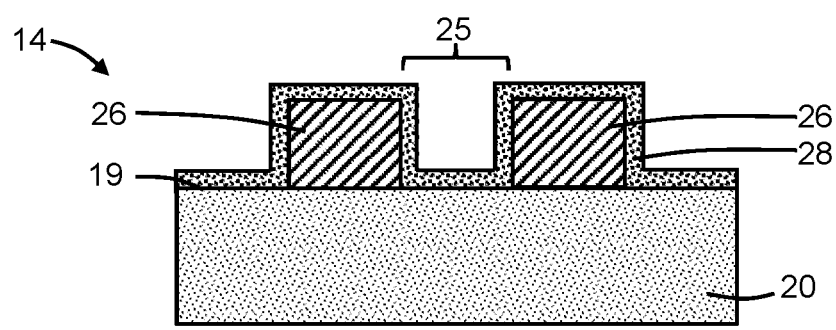
FIG. 2A is a cross-sectional view similar to FIG. 2 of the portion of the photonics chip in accordance with alternative embodiments of the invention.

In an alternative embodiment and as shown in FIG. 2A, the grooves 22 and dielectric regions 24 may be omitted from the construction of the grating coupler 14. In the representative embodiment, the grating structures 26 are arranged as a set of parallel linear features. In an alternative embodiment, the grating structures 26 may be non-linear and, in particular, curved features that are nested together.

Figure 3:
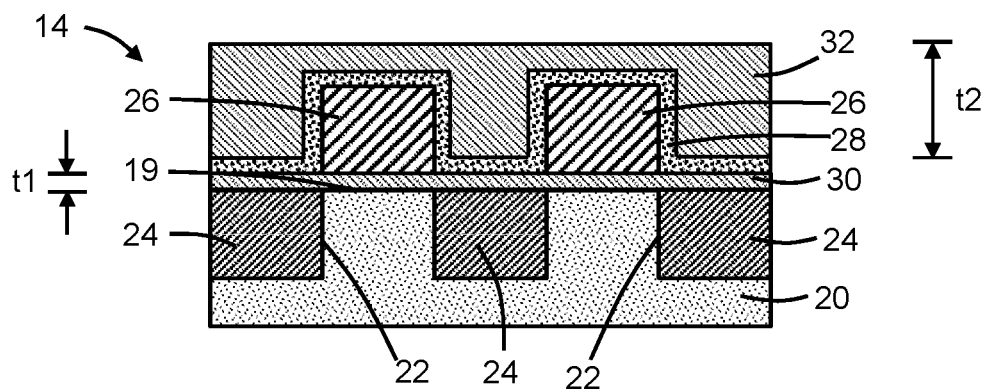
FIG. 3 is a cross-sectional view similar to FIG. 2 of the portion of the photonics chip in accordance with alternative embodiments of the invention.

With reference to FIG. 3 in which like reference numerals refer to like features in FIGS. 1, 2 and in accordance with alternative embodiments of the invention, a dielectric layer 30 may be formed on the top surface 19 of the substrate 20 after the dielectric regions 24 are formed, but before the grating structures 26 are formed and the conformal layer 28 is deposited. In an embodiment, the dielectric layer 30 may be composed of an oxide of silicon (e.g., silicon dioxide ($SiO_2$)) that is deposited by chemical vapor deposition (CVD). The thickness, t1, of the dielectric layer 30 is less than the depth of the grooves 22 or the height of the grating structures 26. The grating structures 26 are arranged on the top surface of the dielectric layer 30.

A dielectric layer 32 may be formed over the grating structures 26 and conformal layer 28. In an embodiment, the dielectric layer 32 may be composed of an oxide of silicon (e.g., silicon dioxide ($SiO_2$)) that is deposited by chemical vapor deposition (CVD). The thickness, t2, of the dielectric layer 32 may be greater than the height of the grating structures 26.

Figure 3A:
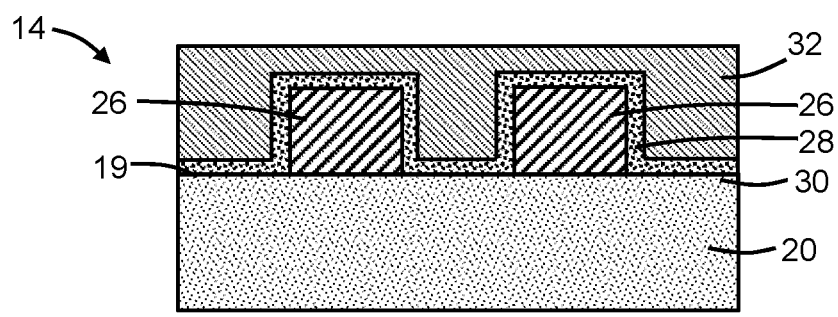
FIG. 3A is a cross-sectional view similar to FIG. 3 of the portion of the photonics chip in accordance with alternative embodiments of the invention.

In an alternative embodiment and as shown in FIG. 3A, the dielectric layer 30 and the grooves 22 and dielectric regions 24 may be omitted from the construction of the grating coupler 14. In an alternative embodiment, only the dielectric layer 32 may be omitted from the construction of the grating coupler 14. In an alternative embodiment, only the grooves 22 and dielectric regions 24 may be omitted from the construction of the grating coupler 14. In an alternative embodiment, only the dielectric layer 30 may be omitted from the construction of the grating coupler 14.

Figure 4:
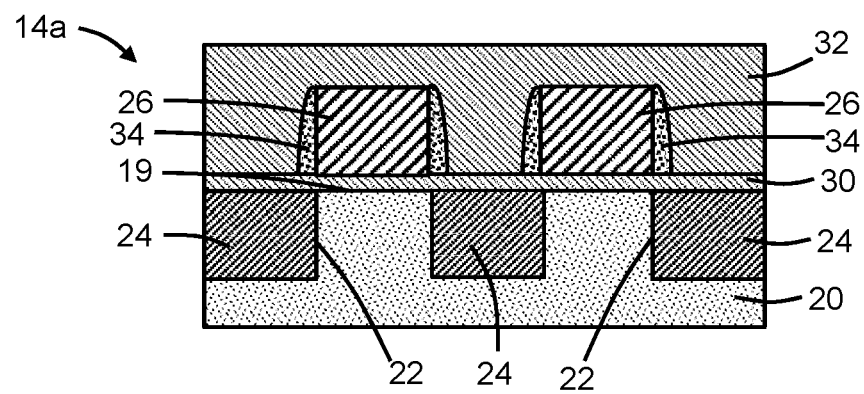
FIG. 4 is a cross-sectional view similar to FIG. 3 of the portion of the photonics chip in accordance with alternative embodiments of the invention.

With reference to FIG. 4 in which like reference numerals refer to like features in FIG. 3 and in accordance with alternative embodiments of the invention, a grating coupler 14a may include spacers 34 that are formed from the material of the conformal layer 28. In an embodiment, the spacers 34 may be formed from the conformal layer 28 using a directional etch process, such as reactive ion etching (RIE). The spacers 34 are arranged adjacent to the sidewalls of the grating structures 26 on the top surface of the dielectric layer 30. In an embodiment in which the dielectric layer 30 is omitted, the spacers 34 are arranged adjacent to the sidewalls of the grating structures 26 on the top surface 19 of the substrate 20.

In an alternative embodiment, the dielectric layer 30 may be omitted from the construction of the grating coupler 14a. In an alternative embodiment, the dielectric layer 32 may be omitted from the construction of the grating coupler 14a. In an alternative embodiment, the grooves 22 and dielectric regions 24 may be omitted from the construction of the grating coupler 14a.

Figure 5:
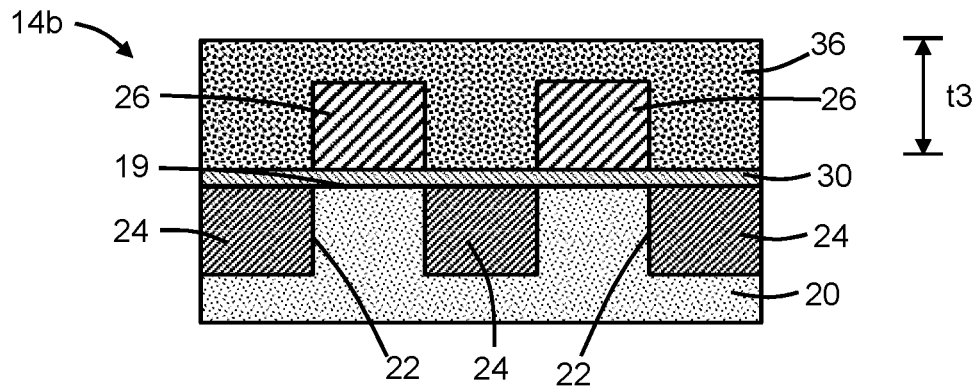
FIG. 5 is a cross-sectional view similar to FIG. 3 of the portion of the photonics chip in accordance with alternative embodiments of the invention.

With reference to FIG. 5 in which like reference numerals refer to like features in FIG. 3 and in accordance with alternative embodiments of the invention, a grating coupler 14b otherwise similar to grating coupler 14 may include a non-conformal layer 36 that is formed as a cladding over the grating structures 26. The non-conformal layer 36 replaces the conformal layer 28, and may be deposited after the grating structures 26 are formed to fill the gaps 25 between the grating structures 26.

In an embodiment, the non-conformal layer 36 may be composed of a material characterized by a refractive index with a real part that is greater than the real part of the refractive index of the material composing the grating structures 26. In an embodiment, the non-conformal layer 36 may be composed of a material characterized by a refractive index with a real part that is greater than the real part of the refractive index of silicon nitride ($Si_3N_4$). In embodiments, the non-conformal layer 36 may composed of titanium nitride (TiN), polycrystalline or amorphous silicon (Si), polycrystalline or amorphous silicon germanium (SiGe), or a layered combination of two or more of these materials deposited by chemical vapor deposition (CVD) or another deposition technique, and polished by chemical mechanical polishing (CMP) to remove topography arising from the underlying grating structures 26 and to provide a planar top surface. Alternatively, the non-conformal layer 36 may be deposited on the dielectric layer 32 and patterned to provide the periodicity of the grating structures 26, followed by forming the grating structures 26 in the gaps 25 between the patterned sections of the non-conformal layer 36.

The non-conformal layer 36 may have a thickness, t3, that is greater than the height of the grating structures 26 such that the grating structures 26 are buried. In an alternative embodiment, the thickness of the non-conformal layer 36 may be equal to the height of the grating structures 26 such that each of the grating structures 26 has an exposed top surface.

In an alternative embodiment, the dielectric layer 30 may be omitted from the construction of the grating coupler 14b. In an alternative embodiment, the grooves 22 and dielectric regions 24 may be omitted from the construction of the grating coupler 14b. In an alternative embodiment, the dielectric layer 30 and the grooves 22 and dielectric regions 24 may be omitted from the construction of the grating coupler 14b.

Figure 6:
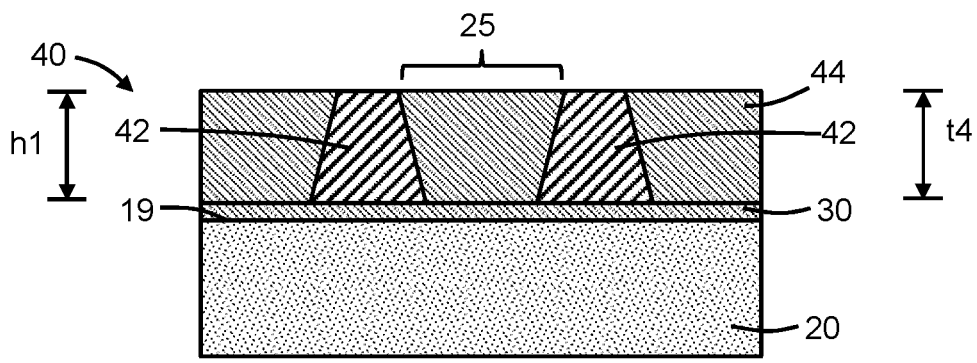
FIG. 6 is a cross-sectional view of a portion of photonics chip in accordance with alternative embodiments of the invention.

With reference to FIG. 6 in which like reference numerals refer to like features in FIG. 1 and in accordance with alternative embodiments of the invention, a grating coupler 40 includes a periodic arrangement of grating structures 42 that are arranged above or over the top surface 19 of the substrate 20. The grating structures 42 may be formed by depositing a layer of material and patterning the layer using lithography and etching processes. In an embodiment, the material constituting the grating structures 42 may be a composed of a nitride of silicon (e.g., silicon nitride ($Si_3N_4$)) that is deposited by chemical vapor deposition (CVD). The deposited layer may be etched using an isotropic etching process that includes a horizontal etch component, in addition to a vertical etch component. The isotropic etching process may be wet chemical etching, dry etching (e.g., reactive ion etching (RIE)), or another type of etching process. The isotropy of the etching process forms the grating structures 42 with a tapered, trapezoidal shape. The grating structures 42 have a period or pitch and a height, h1, relative to the top surface 19 of the substrate 20 that is equal to the thickness of the deposited layer. The number of grating structures 42 may be greater than shown in the exemplary embodiment.

A dielectric layer 44 may be formed over the grating structures 42. In an embodiment, the dielectric layer 44 may be composed of an oxide of silicon (e.g., silicon dioxide ($SiO_2$)) that is deposited by chemical vapor deposition (CVD). The thickness, t4, of the dielectric layer 44 may be equal to the height, h1, of the grating structures 42.

Figure 6A:
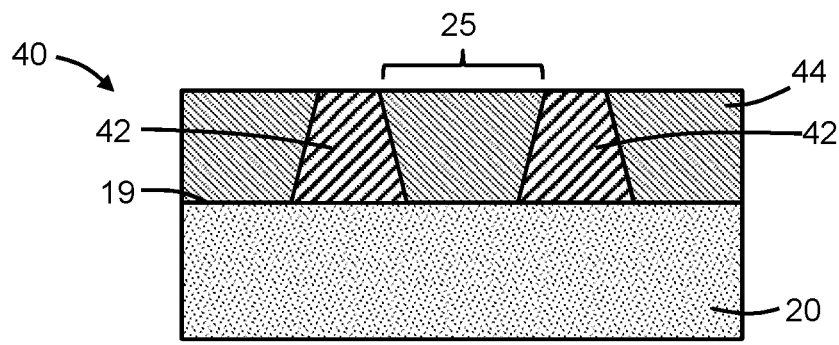
FIG. 6A is a cross-sectional view similar to FIG. 6 of the portion of the photonics chip in accordance with alternative embodiments of the invention.

In an alternative embodiment and as shown in FIG. 6A, the dielectric layer 30 may be omitted from the construction of the grating coupler 40.

Figure 7:
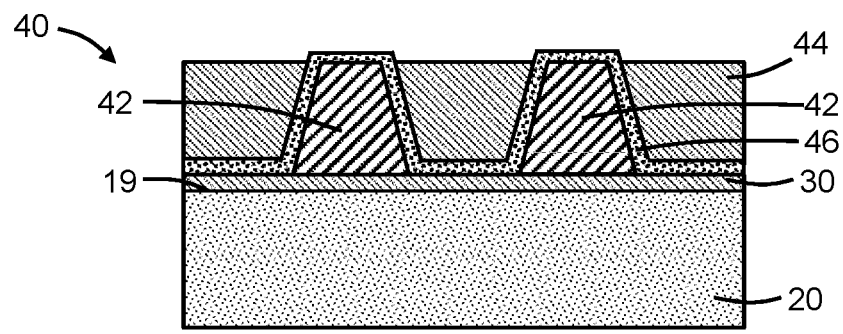
FIGS. 7-9 are cross-sectional views similar to FIG. 6 of the portion of photonics chip in accordance with alternative embodiments of the invention.

With reference to FIG. 7 in which like reference numerals refer to like features in FIG. 6 and in accordance with alternative embodiments of the invention, a conformal layer 46 may be formed as a cladding over the grating structures 42 and on the top surface 19 of the substrate 20 in the gaps 25 between the grating structures 42 before the dielectric layer 44 is deposited. In an embodiment, the conformal layer 46 may be composed of a material characterized by a refractive index with a real part that is greater than the real part of the refractive index of the material composing the grating structures 42. In an embodiment, the conformal layer 46 may be composed of a material characterized by a refractive index with a real part that is greater than the real part of the refractive index of silicon nitride ($Si_3N_4$) over a wavelength range of 1 micron to 9 microns. In embodiments, the conformal layer 46 may composed of titanium nitride (TiN), zirconium nitride (ZrN), or a layered combination of these materials deposited by atomic layer deposition (ALD) or another deposition technique.

In an alternative embodiment, the dielectric layer 30 may be omitted from the construction of the grating coupler 40.

Figure 8:
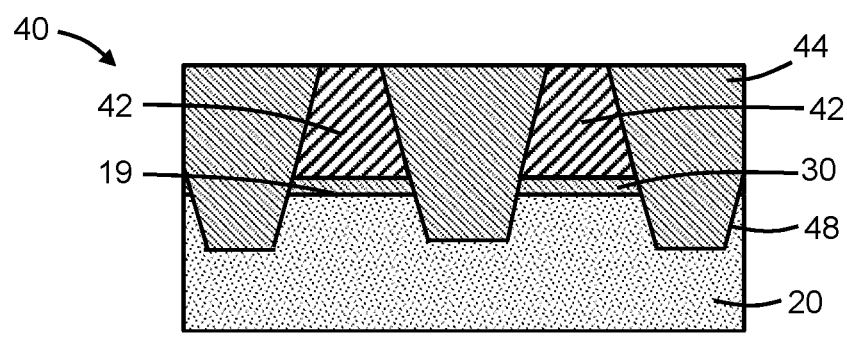

With reference to FIG. 8 in which like reference numerals refer to like features in FIG. 6 and in accordance with alternative embodiments of the invention, the etching process may be continued after the grating structures 42 are formed to define shallow trenches 48 in the substrate 20 that are arranged in the gaps 25 between the grating structures 42. In an alternative embodiment, the conformal layer 46 may be applied to the grating structures 42 as shown in FIG. 7 and may extend conformally into the shallow trenches 48, and the dielectric layer 44 may be deposited after the conformal layer 46 is formed.

In an alternative embodiment, the dielectric layer 30 may be omitted from the construction of the grating coupler 40.

Figure 9:
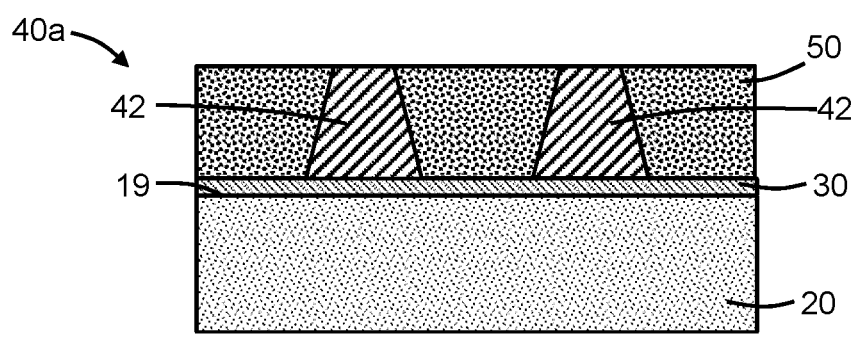

With reference to FIG. 9 in which like reference numerals refer to like features in FIG. 8 and in accordance with alternative embodiments of the invention, a grating coupler 40a may include a non-conformal layer 50 that is formed as a cladding over the grating structures 42. The non-conformal layer 50 replaces the conformal layer 46, and may be deposited after the grating structures 42 are formed to fill the gaps 25 between the grating structures 42. In an embodiment, the non-conformal layer 50 may be composed of a material characterized by a refractive index with a real part that is greater than the real part of the refractive index of the material composing the grating structures 42. In an embodiment, the non-conformal layer 50 may have a thickness that is equal to the height of the grating structures 42. In an embodiment, the non-conformal layer 50 may be composed of a material characterized by a refractive index with a real part that is greater than the real part of the refractive index of silicon nitride ($Si_3N_4$). In embodiments, the non-conformal layer 36 may composed of titanium nitride (TiN), zirconium nitride (ZrN), or a layered combination of these materials deposited by chemical vapor deposition (CVD) or another deposition technique, and polished by chemical mechanical polishing (CMP) to remove topography arising from the underlying grating structures 42 and to provide a planar top surface.

In an alternative embodiment, the dielectric layer 30 may be omitted from the construction of the grating coupler 40.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" and "lateral" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. An electronic device structure comprising:
a substrate including a plurality of trenches extending into the substrate;
a plurality of dielectric regions positioned in the trenches;
a grating coupler including a plurality of grating structures arranged on the substrate, gaps separating the grating structures, and a first layer arranged conformally over the grating structures, wherein the dielectric regions and the trenches are respectively arranged in the substrate in alignment with the gaps, the grating structures are composed of a first material characterized by a first refractive index with a real part, the first layer is composed of a second material characterized by a second refractive index with a real part, and the real part of the second refractive index is greater than the real part of the first refractive index of the first material for electromagnetic radiation with a wavelength in a range of 1 micron to 9 microns.

2. The electronic device structure of claim 1 wherein the first material is silicon nitride, and the second material is titanium nitride, polycrystalline silicon, amorphous silicon, polycrystalline silicon germanium, amorphous silicon germanium, or a layered combination thereof.

3. The electronic device structure of claim 1 further comprising:

a second layer arranged to fill the gaps, wherein the second layer is composed of a dielectric material, the grating structures have a height relative to the substrate, and the second layer has a thickness that is greater than or equal to the height of the grating structures.

4. The electronic device structure of claim 1 further comprising:

a second layer arranged between the grating structures and a top surface of the substrate, the second layer composed of a dielectric material.

5. The electronic device structure of claim 1 wherein the grating structures are linear and have a parallel arrangement.

6. The electronic device structure of claim 1 wherein each of the grating structures has a trapezoidal shape.

7. The electronic device structure of claim 6 wherein the substrate has a top surface, and the trapezoidal shape is widest at the top surface of the substrate.

8. The electronic device structure of claim 1 wherein the first layer is conformally arranged over the dielectric regions.

9. An electronic device structure comprising:

a substrate including a plurality of trenches extending into the substrate;

a plurality of dielectric regions positioned in the trenches;

a grating coupler including a plurality of grating structures arranged on the substrate, gaps separating the grating structures, and a first layer arranged over the grating structures, wherein the dielectric regions and the trenches are arranged in the substrate in alignment with the gaps, the grating structures are composed of a first material characterized by a first refractive index with a real part, the first layer is composed of a second material characterized by a second refractive index with a real part, and the real part of the second refractive index is greater than the real part of the first refractive index of the first material for electromagnetic radiation with a wavelength in a range of 1 micron to 9 microns, the first layer is arranged to fill the gaps, the first layer includes portions that are positioned in the gaps in alignment with the dielectric regions, the grating structures have a height relative to the substrate, and the first layer has a thickness that is greater than or equal to the height of the grating structures.

10. A method of fabricating an electronic device structure, the method comprising:

forming a plurality of grating structures on a substrate, wherein the grating structures are separated by gaps;

forming a plurality of trenches that extend into the substrate; and filling the trenches with a dielectric material; and forming a layer conformally over the grating structures, wherein the dielectric regions and the trenches are respectively arranged in the substrate in alignment within the gaps, the grating structures are composed of a first material characterized by a first refractive index with a real part, the layer or the spacers are composed of a second material characterized by a second refractive index with a real part, and the real part of the second refractive index is greater than the real part of the first refractive index of the first material for electromagnetic radiation with a wavelength in a range of 1 micron to 9 microns.

11. The method of claim 10 wherein the first material is silicon nitride, and the second material is titanium nitride, polycrystalline silicon, amorphous silicon, polycrystalline silicon germanium, amorphous silicon germanium, or a layered combination thereof.

12. The method of claim 10 wherein the layer is conformally arranged over the dielectric regions.

13. The method of claim 10 wherein further comprising:

etching the conformally-formed layer to form spacers at a plurality of sidewalls of the grating structures.

* * * * *

UNITED STATES PATENT AND TRADEMARK OFFICE
CERTIFICATE OF CORRECTION

PATENT NO. : 10,746,925 B2
APPLICATION NO. : 15/878025
DATED : August 18, 2020
INVENTOR(S) : Ajey P. Jacob et al.

Page 1 of 1

It is certified that error appears in the above-identified patent and that said Letters Patent is hereby corrected as shown below:

In the Claims
At Column 8, Claim No. 10, Line number 30, change "the layer or the spacers are" to --the layer is--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*